US011180397B2

(12) United States Patent
Bjorklund et al.

(10) Patent No.: US 11,180,397 B2
(45) Date of Patent: Nov. 23, 2021

(54) SALT PRODUCTION FROM WASTEWATER

(71) Applicant: Aquatech International, LLC, Canonsburg, PA (US)

(72) Inventors: Daniel P. Bjorklund, Waukesha, WI (US); Vinod A. Raje, Hartland, WI (US); James M. Marlett, Menomonee Falls, WI (US); Manish Backliwal, Brookfield, WI (US); Richard Schoen, Hartland, WI (US); Gregory Mandigo, DeForest, WI (US)

(73) Assignee: AQUATECH INTERNATIONAL, LLC, Canonsburg, PA (US)

( * ) Notice: Subject to any disclaimer, the term of this patent is extended or adjusted under 35 U.S.C. 154(b) by 0 days.

(21) Appl. No.: 16/207,908

(22) Filed: Dec. 3, 2018

(65) Prior Publication Data
US 2019/0169056 A1 Jun. 6, 2019

Related U.S. Application Data

(60) Provisional application No. 62/594,287, filed on Dec. 4, 2017.

(51) Int. Cl.
*C02F 9/00* (2006.01)
*C02F 1/44* (2006.01)
(Continued)

(52) U.S. Cl.
CPC ............... *C02F 9/00* (2013.01); *C02F 1/048* (2013.01); *C02F 1/42* (2013.01); *C02F 1/441* (2013.01);
(Continued)

(58) Field of Classification Search
CPC .. C02F 2001/5218; C02F 9/00; C02F 11/121; C02F 1/048; C02F 1/66; C02F 1/441;
(Continued)

(56) References Cited

U.S. PATENT DOCUMENTS

| | | | | |
|---|---|---|---|---|
| 4,036,749 A | * | 7/1977 | Anderson | B01D 61/025 210/638 |
| 2003/0080066 A1 | * | 5/2003 | Vohra | C01D 3/06 210/714 |
| 2006/0196836 A1 | * | 9/2006 | Arakel | B01D 61/025 210/723 |

FOREIGN PATENT DOCUMENTS

CN 105152443 A 12/2015

OTHER PUBLICATIONS

Office Action dated Jul. 1, 2021, in corresponding Chinese Patent Application No. 201810252344X and English Translation (13 pages).
(Continued)

*Primary Examiner* — Krishnan S Menon
(74) *Attorney, Agent, or Firm* — Buchanan Ingersoll & Rooney PC

(57) ABSTRACT

Many processes generate wastewater streams rich in sulfate and chloride. These salt components are traditionally not recovered and are discharged to the environment. The invention recovers pure water for recycle/reuse and simultaneously generates valuable pure salts of NaCl and $Na_2SO_4$ for beneficial reuse, eliminating the waste stream. Process consists of the sequential crystallization of salt products with an intermediate purification step in which a chemical reactant is added to elevate levels of purity. The process is configured to simultaneously achieve zero liquid discharge.

20 Claims, 8 Drawing Sheets

(51) Int. Cl.
*C02F 1/42* (2006.01)
*C02F 1/52* (2006.01)
*C02F 101/10* (2006.01)
*C02F 103/00* (2006.01)
*C02F 103/36* (2006.01)
*C02F 11/121* (2019.01)
*C02F 1/04* (2006.01)
*C02F 1/66* (2006.01)

(52) U.S. Cl.
CPC ............ *C02F 1/442* (2013.01); *C02F 1/5236* (2013.01); *C02F 1/66* (2013.01); *C02F 11/121* (2013.01); *C02F 2001/425* (2013.01); *C02F 2001/5218* (2013.01); *C02F 2101/10* (2013.01); *C02F 2103/001* (2013.01); *C02F 2103/365* (2013.01); *C02F 2301/08* (2013.01)

(58) Field of Classification Search
CPC ...... C02F 2001/425; C02F 1/442; C02F 1/42; C02F 1/5236; C02F 2301/08; C02F 2101/10; C02F 2103/001; C02F 2103/365; Y02W 10/37
See application file for complete search history.

(56) References Cited

OTHER PUBLICATIONS

Search Report dated Jun. 24, 2021, in corresponding Chinese Patent Application No. 201810252344X and English Translation (4 pages).

* cited by examiner

PRIOR ART

PRIOR ART

PRIOR ART

SALT PRODUCTION FROM WASTEWATER

CROSS-REFERENCE TO RELATED APPLICATIONS

This application claims benefit of U.S. Provisional Patent Application No. 62/594,287, filed on Dec. 4, 2017. That application is incorporated by reference as if fully rewritten herein.

BACKGROUND OF THE INVENTION

Field of the Invention

Embodiments relate to purification of wastewater streams, especially wastewater streams rich in sulfate and chloride.

Background of the Related Art

Purification and/or reuse of wastewater is a persistent challenge in many industries. The energy industry, in particular, must often address the purification of wastewater from energy extraction. As alternative energy sources are sought, or as additional supplies are extracted from existing sources, new wastewater sources are generated. With those new wastewater sources come new challenges as new impurities or mixtures of impurities become significant.

For example, China has one of the world's largest coal reserves, but limited oil and gas supplies. Oil consumption is outstripping domestic supplies and China is poised to be the leading consumer of oil in the near future. Due to the same, China has started developing "coal to X" (CTX) projects, where "X" can be a variety of products including chemical, liquid, or gas. The typical CTX process consists of coal preparation followed by gasification, purification, liquefaction, followed by upgrading and fractionation to different products. These include, for example, commodities like gas, gasoline, diesel, jet fuels, ammonia, polypropylene and polyethylene.

Significant amounts of water are used in the gasification step. Wastewater from gasification plants includes streams generated during normal operations and maintenance activities. The streams include, for example, but are not limited to cooling tower blowdown, blowdown from circulating water systems in the gasification block, blowdown from the demineralizer system, as well as rainwater.

Another large water requirement is process water, which is used to cool and clean the syngas to remove fly ash, halogens and trace organic and inorganic components. The concentration level of specific contaminants depends upon the fuel characteristics and the type of gasifier employed in the design. The quantity of water required depends on the capacity of syngas treated, the degree of gas cooling required, and the contaminants to be removed.

The waste water streams generated at such facilities typically require disposal. Wastewater comprises impurities like organic and inorganic matter. Because of these impurities, disposal of this water directly into environment is typically not permitted. To aid in disposal this wastewater can be treated by using various technologies. These include, for example, biological treatment, clarification, filtration, ion exchange methods, membrane based systems such as ultra-filtration, nano-filtration, reverse osmosis, as well as thermal based systems like evaporators and crystallizers.

Thermal based systems are the most reliable and effective technology, if the intention is to achieve Zero Liquid Discharge (ZLD). In ZLD processes, water is separated from the rest of the dissolved and suspended solids by the evaporation process. Evaporated water is condensed and recycled back to industrial processes which reduces the fresh water consumption of the plant. Solids are then disposed of more easily than they would be if they were in solution.

Newer facilities typically have some level of treatment prior to discharging the waste water back to the local water body in the environment. In some cases, the facility may also have a water recovery system which could include an RO membrane process or a thermal evaporation process, among others. In such facilities, some fraction of the waste water is recovered as an acceptably pure water for reuse, which decreases the facility's fresh water consumption. The recovered water can beneficially be reused in the cooling tower, boiler, or other processes.

In some CTX facilities, zero-liquid discharge systems have been integrated, which maximize the recovery of water. Such systems include thermal crystallization systems which generate mixed-salts which are only suitable for disposal in a landfill. Solids generated from the traditional ZLD process include salts like NaCl, $Na_2SO_4$, KCl, $NaNO_3$, $CaSO_4$, $CaCO_3$, and organic matter. These solids are dewatered and are normally disposed of in the landfill.

Although the background of this application has focused on the energy industry in general and more particularly on water used and produced during gasification, other industries generate wastewater with similar contaminants and therefore similar challenges.

There are technologies in development that hope to achieve separation of chloride and sulfate salts as a pretreatment prior to crystallization. These technologies include nano-filtration, among others. In such designs, the nano-filtration (NF) membrane is used to reject sulfate and other multivalent salts to generate a relatively pure NaCl stream as a membrane permeate. This NaCl stream may be processed with direct crystallization to produce a pure NaCl salt product. However, this technology has the disadvantage of operating a low overall recovery of the NaCl salt, since much of the NaCl also reports to the reject stream. A further, and most significant disadvantage, is that a reject stream is generated containing $Na_2SO_4$ and NaCl mixture. In this way, the NF effectively reduces the quantity of the mixed-salt stream (in terms of total flow rate) but does not address the problem of maximizing the recovery of NaCl and $Na_2SO_4$ salts.

BRIEF SUMMARY OF THE INVENTION

Embodiments of the present invention may include a thermal crystallization water treatment system used to achieve Zero Liquid Discharge (ZLD) and simultaneously generate NaCl and $Na_2SO_4$ salt products for beneficial reuse. In some embodiments the salts are pure salts. In this technology, water is separated from contaminants by using evaporation and recycled back to other possible uses. In some embodiments the wastewater that is treated includes sodium, chloride, and sulfate ions.

In one embodiment the water treatment system is unsed on wastewater streams from a CTX plant. Of the contaminants present in the wastewater streams from the CTX plant, the majority of impurities from wastewater contains Sodium (Na), Chlorides (Cl) and Sulfate ($SO_4$) ions. This makes CTX wastewater ideal for treatment using embodiments as reported herein. These minerals are extracted from wastewater to produce industrial grade salts like NaCl and $Na_2SO_4$. This invented technology overcomes the limitations of present technology in that contaminants in the wastewater can be converted to valuable products.

An embodiment may provide a method for salt production from waste water streams, comprising (a) providing a wastewater stream comprising sulfate ions and chloride ions; (b) pretreating the wastewater stream with at least one unit operation selected from the group consisting of hardness removal, silica reduction, alkalinity reduction, total organic carbon reduction, and pH adjustment; (c) feeding the wastewater stream to a first stage crystallizer, thereby precipitating and growing sodium sulfate crystals in a first mother liquor; (d) separating the sodium sulfate crystals from the first mother liquor; (e) collecting the first mother liquor and sending it to a chemical reaction vessel; (f) dosing a reactive chemical to the chemical reaction vessel, thereby removing sulfate ion from solution in the wastewater stream as a precipitated solid and removing the precipitated solid to produce a purified sodium chloride brine; (g) sending the purified sodium chloride brine into a second stage crystallizer, thereby precipitating and growing sodium chloride crystals in a second mother liquor; and (h) separating the sodium chloride crystals from the second mother liquor.

An embodiment may provide a method for salt production from waste water streams, comprising (a) providing a wastewater stream comprising sulfate ions and chloride ions; (b) pretreating the wastewater stream with at least one unit operation selected from the group consisting of hardness removal, silica reduction, alkalinity reduction, total organic carbon reduction, and pH adjustment; (c) sending the wastewater stream to a chemical reaction vessel; (d) dosing a reactive chemical to the chemical reaction vessel, thereby removing sulfate ion from solution in the wastewater stream as a precipitated solid and removing the precipitated solid to produce a purified sodium chloride brine; (e) sending the purified sodium chloride brine into a second stage crystallizer, thereby precipitating and growing sodium chloride crystals in a second mother liquor; and (f) separating the sodium chloride crystals from the second mother liquor.

Embodiments may include a further step of concentrating the wastewater stream prior to at least one of the pretreatment step and the step of sending the wastewater stream to a chemical reaction vessel. The concentration step may include at least one process selected from the group consisting of membrane concentration and thermal evaporation. In some embodiments, separating steps are conducted by dewatering in a centrifuge.

The waste water may be from one or more sources. For example, it may be process water from a gasification system. It may be water used in another CTX system. It may be industrial process wastewater. In some embodiments it is deoiled waste water from a steam assisted gravity drainage process for obtaining oil sands. In some embodiments the water is a municipal waste water.

In some embodiments the reactive chemical is selected from the group consisting of $CaCl_2$, $Ca(NO_3)_2$, and $Ca(OH)_2$. Some embodiments provide a further step of recycling water from the second mother liquor into the process that originally generated the waste water. Some embodiments provide a further step of washing and/or drying the sodium sulfate salt, thereby enhancing its purity. Some embodiments provide the further step of washing and/or drying the sodium chloride salt, thereby enhancing its purity.

Some embodiments provide a further step of removing a purge stream from the second stage crystallizer, thereby enhancing salt purity. Some embodiments provide a further step of processing the purge stream in a processor selected from the group consisting of a mixed-salt crystallizer and a dryer.

In some embodiments the process from which the waste water is obtained and method for salt production operate as a zero liquid discharge system with respect to water. In some embodiments the pretreatment step is a hardness removal step, and wherein the hardness removal step produces a regeneration waste stream from an ion exchanger.

In some embodiments the regeneration waste stream comprises $CaCl_2$, wherein the $CaCl_2$ is recycled as a reactive chemical.

Some embodiments include the step of evaporating water in the crystallizer with at least one of mechanical vapor compression, steam driven, multiple effect evaporation, and thermo-compressor driven evaporation. In some embodiments the preconcentrating step is a membrane concentration step, and wherein the membrane concentration step is a nanofiltration that rejects substantially all (more than 90% of the influent) of the sulfate ion from the waste stream.

BRIEF DESCRIPTION OF THE FIGURES

Figures

DETAILED DESCRIPTION OF THE INVENTION

Figure 1:
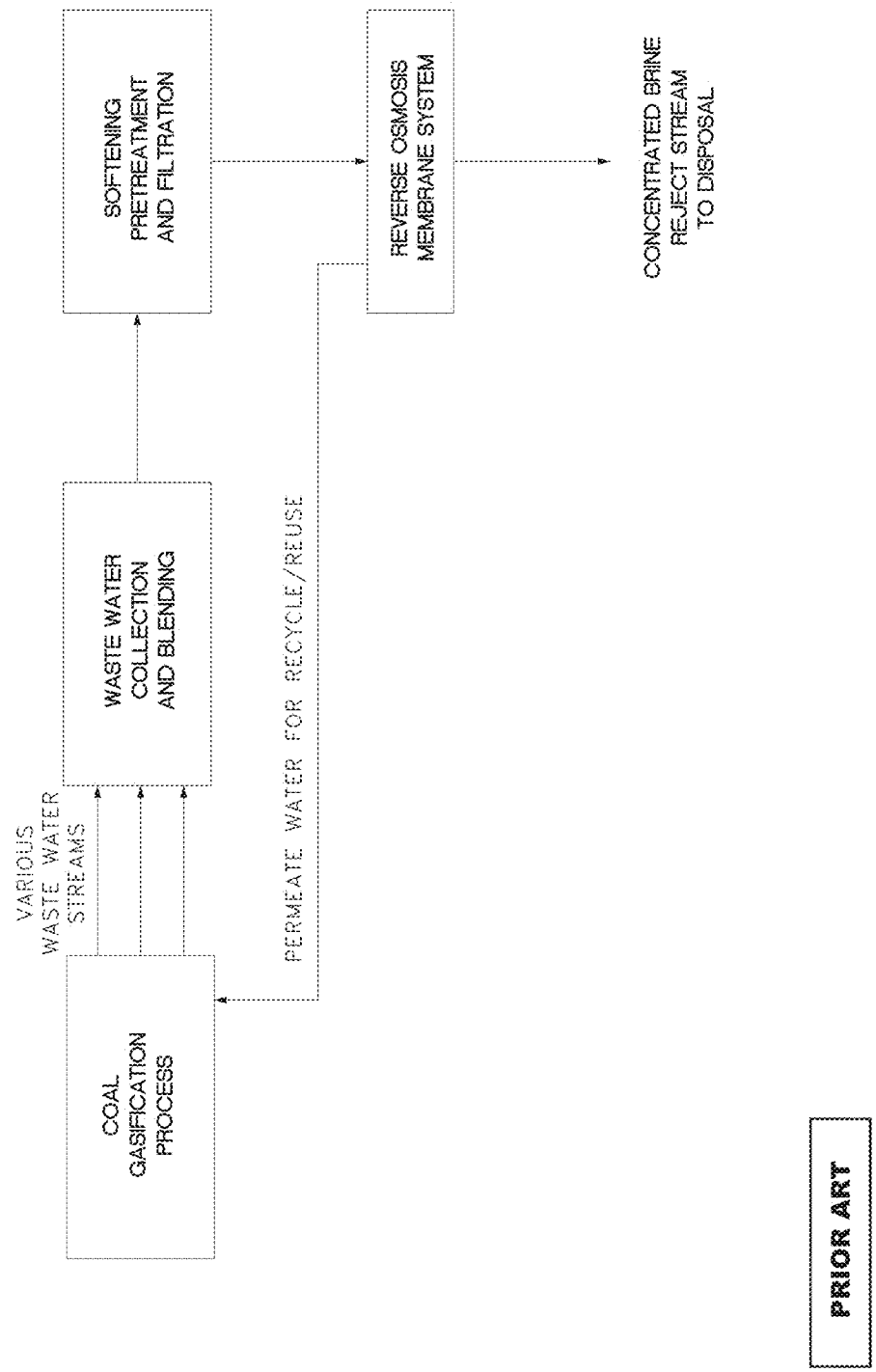
FIG. 1: Block flow diagram showing conventional CTX waste water treatment comprised of softening pretreatment and membrane concentration with concentrated brine for discharge to environment/disposal.
Figure 2:
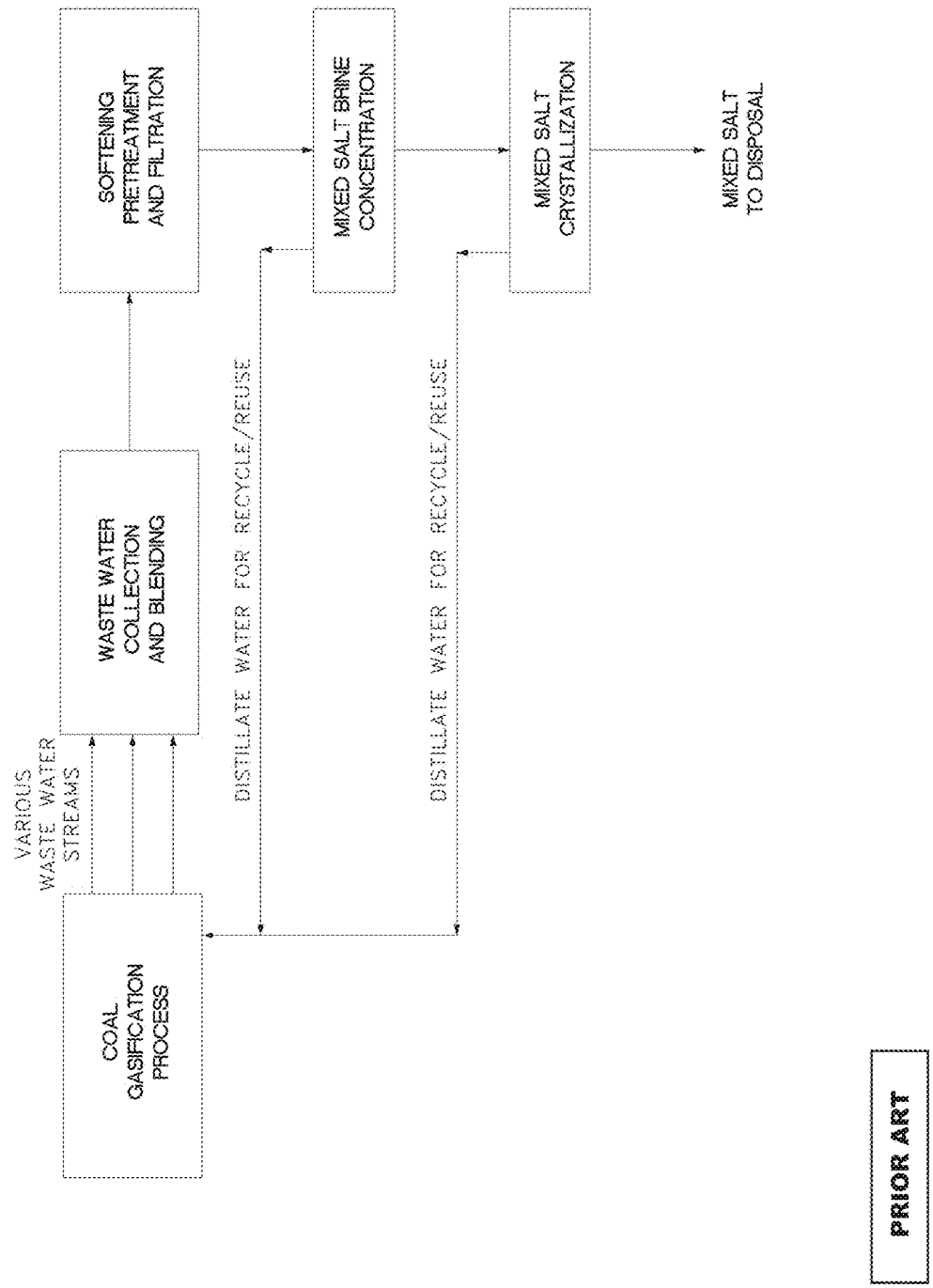
FIG. 2: Block flow diagram showing conventional CTX waste water treatment achieving zero-liquid discharge and generating a mixed salt for disposal.
Figure 3:
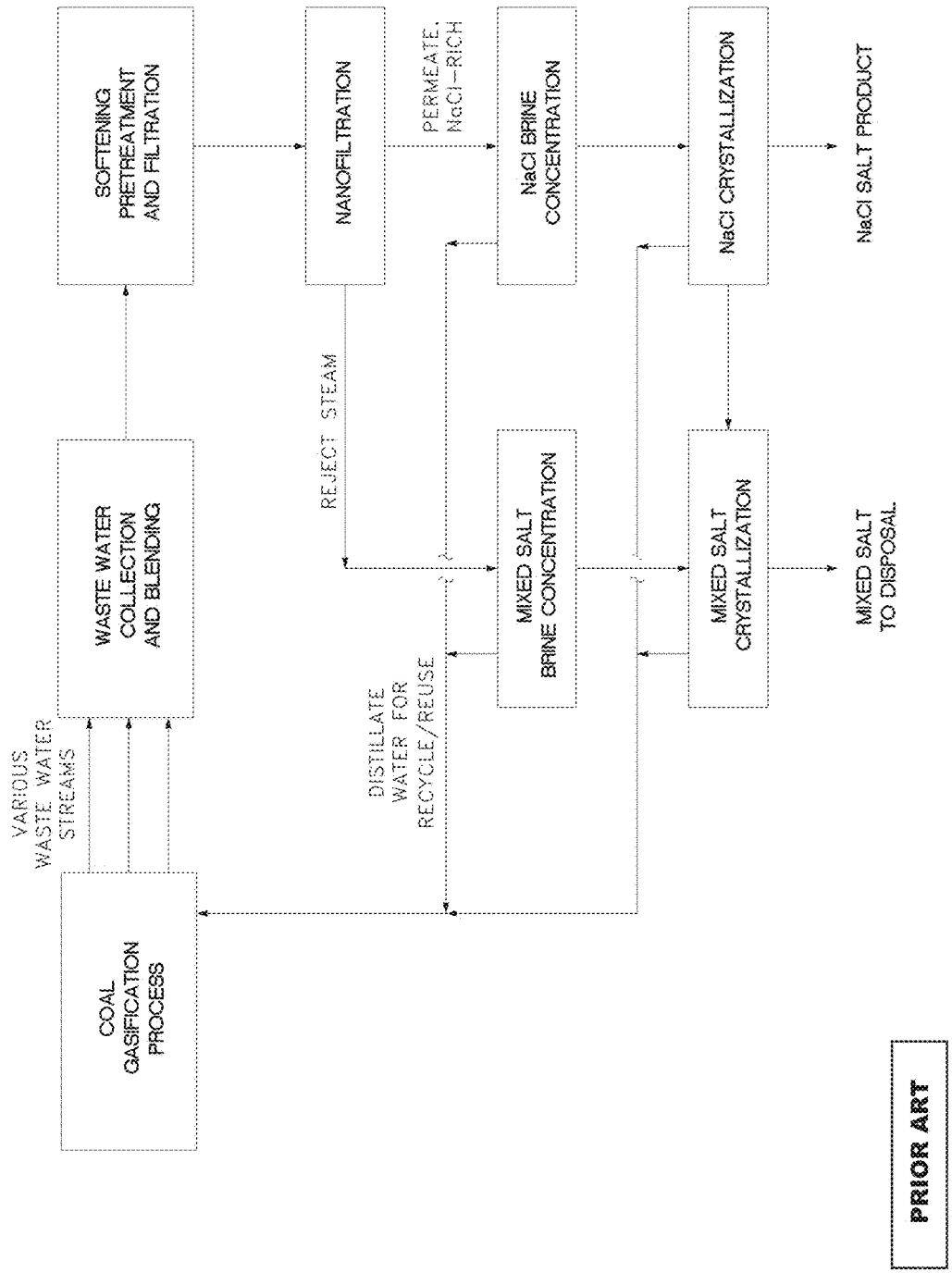
FIG. 3: Block flow diagram showing CTX waste water treatment including a nanofiltration step to generate a sodium chloride rich stream which is recovered as a pure sodium chloride salt product. At the same time, the reject stream from the nanofiltration step is blended with purge water and treated with a mixed-salt crystallizer to generate a mixed-salt solid for disposal.
Figure 4:
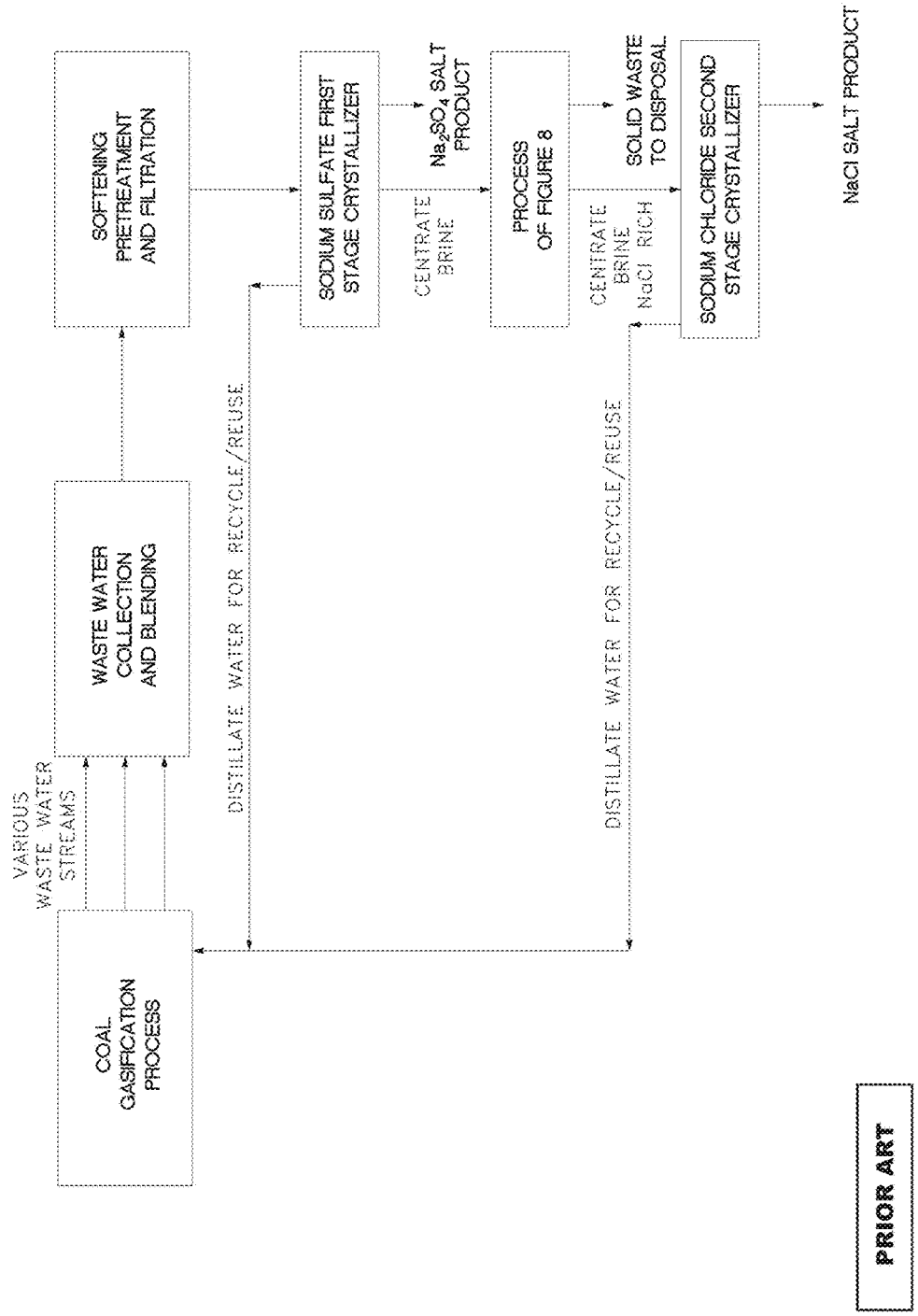
FIG. 4: Block flow diagram showing an embodiment of our process. Block flow diagram showing all inventive steps of claim #1, including coal gasification block and waste water streams, and distillate recycle.
Figure 5:
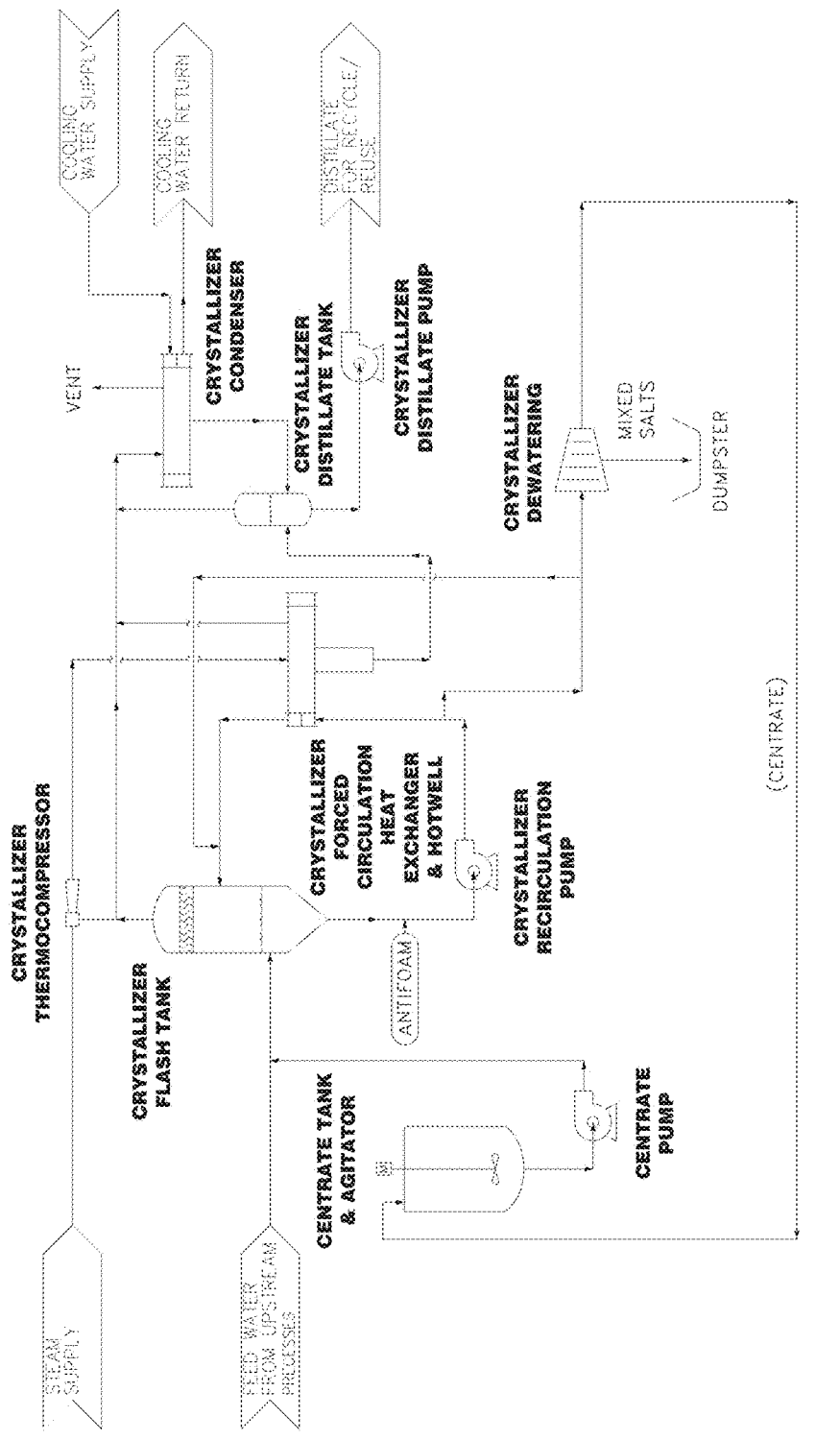
FIG. 5: Process flow diagram of a forced-circulation crystallizer, driven with steam through a thermocompressor.
Figure 6:
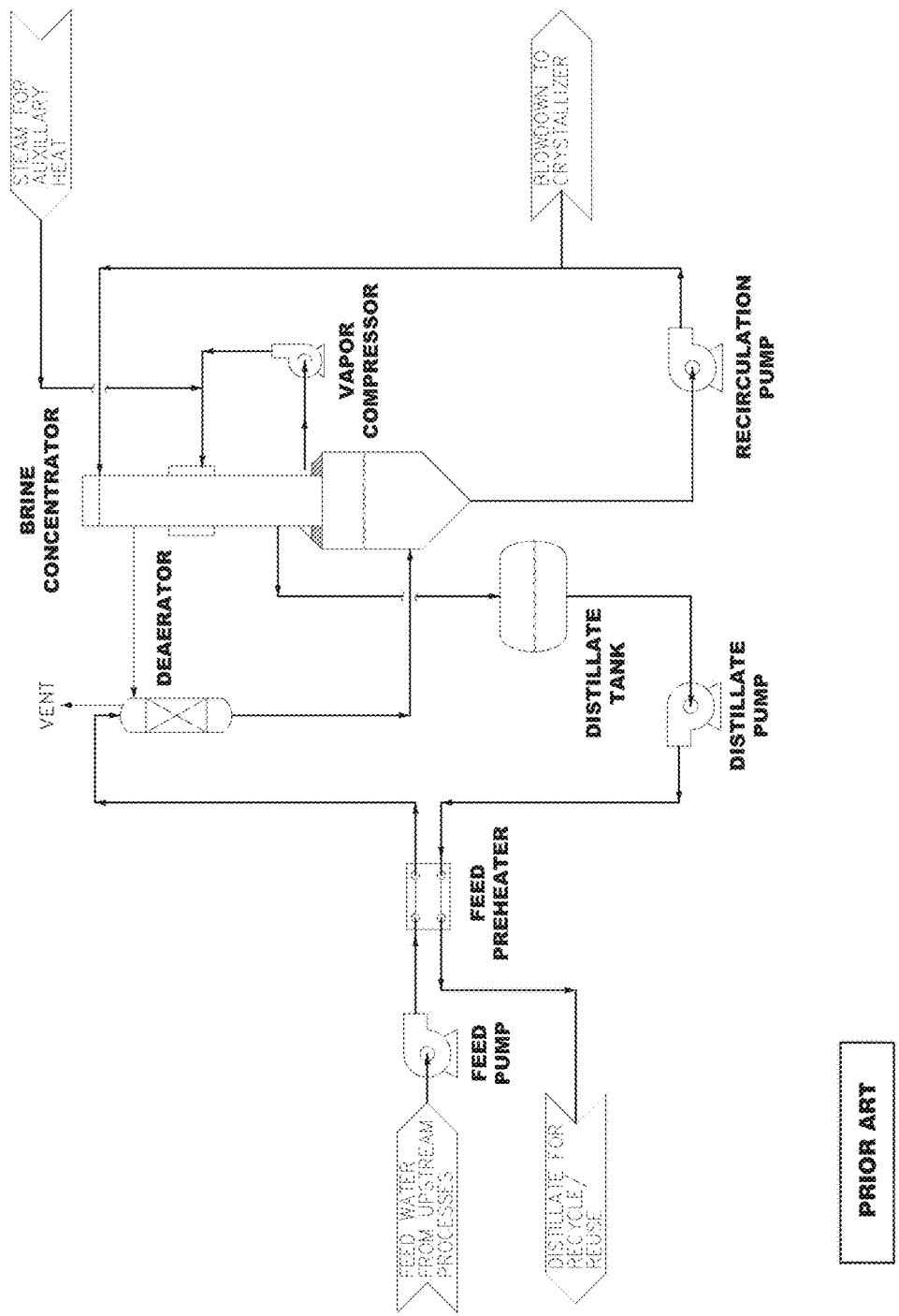
FIG. 6: Process flow diagram of a brine concentrator, driven with a mechanical vapor compressor.
Figure 7:
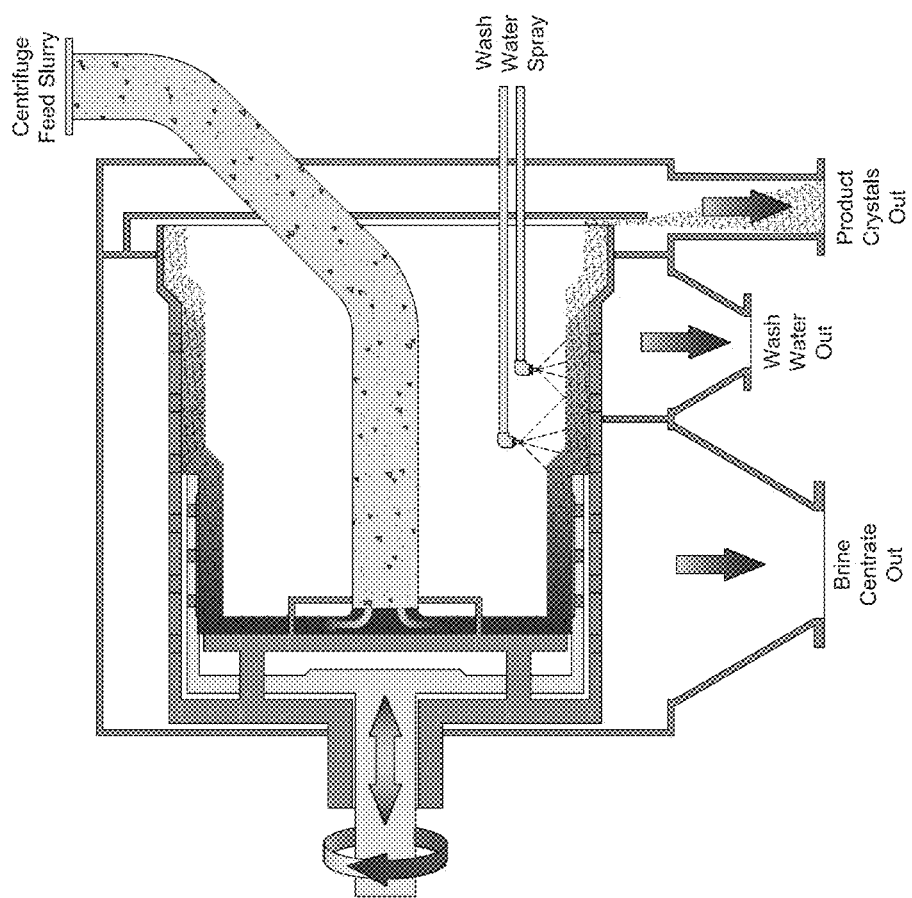
FIG. 7: Representative equipment sketch of a pusher type centrifuge for dewatering of product salt from the mother liquor and showing washing step for displacement of mother liquor for salt purity enhancement.
Figure 8:
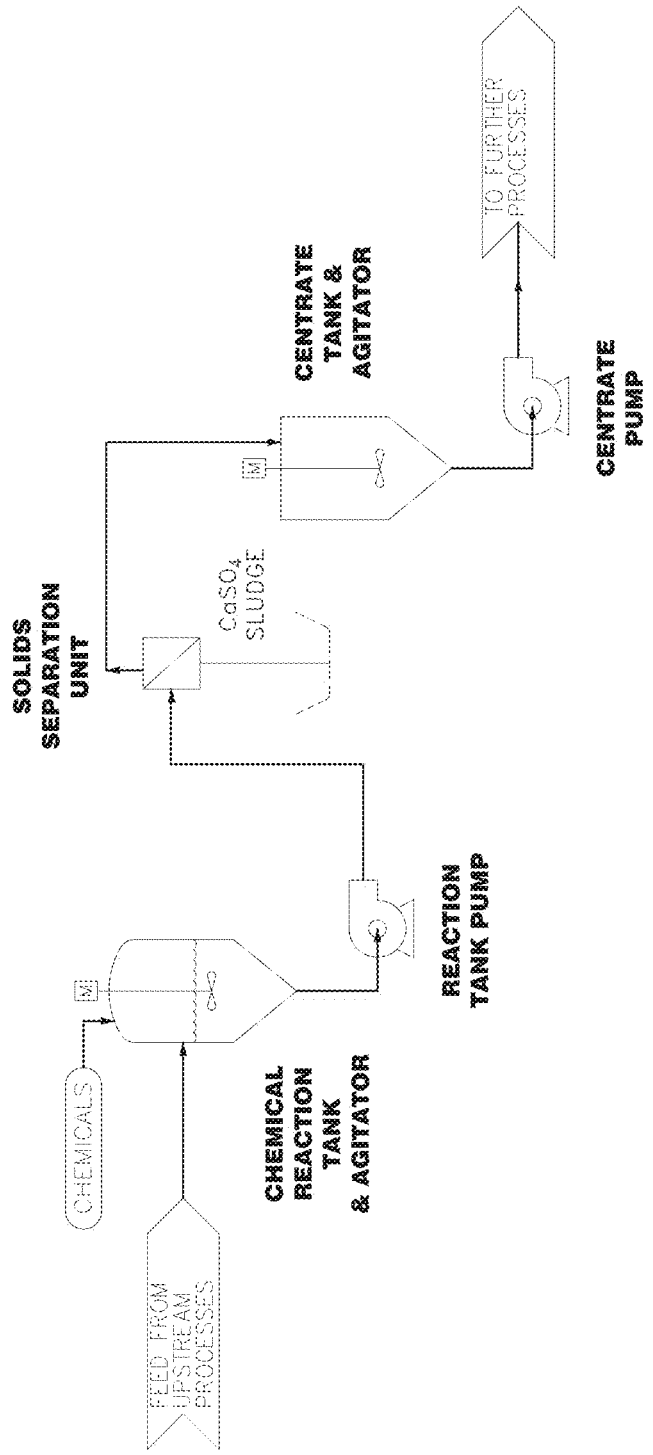
FIG. 8: Process flow diagram of a process as described herein, showing the chemical reaction tank, calcium sulfate separation and sodium chloride crystallizer feed tank.

In the invented process, the blended waste water streams are blended to form a single waste water stream for treatment. Depending on the specific impurities that exist in the waste water, various typical water treatment operations may be employed to reduce the levels of impurities to acceptable levels. The most common impurities are calcium and magnesium. They may be treated with a softening clarifier, in which chemical agents such a lime, sodium hydroxide and soda ash are added to the stream to affect the precipitation of hardness. The precipitated impurities are thickened and dewatered to form a sludge for disposal. Typically, the concentration of hardness after softening clarification is less than about 100 mg/L (as CaCO$_3$).

Other pretreatment operations can also be considered depending on the presence of impurities. Such operations can include removal of organic compounds, alkalinity removal, neutralization and pH adjustment.

The pretreated waste water is then sent to a two-stage crystallization process. The two-stage crystallization allows one to separate Na$_2$SO$_4$ and NaCl salts, each in their own respective crystallizer. Na$_2$SO$_4$ salts are extracted in 1$^{st}$ stage crystallization, where majority of Na$_2$SO$_4$ salts precipitate from the solution at high NaCl concentration. Blowdown from 1$^{st}$ stage crystallizer includes brine with NaCl salts and some SO$_4$ ions.

Those skilled in the art will recognize that "crystallizer" as used herein may contemplate one of many different options. For example, a crystallizer may be, but is not limited to, a forced-circulation crystallizer, a calandria crystallizer, an Oslo crystallizer, and a draft-tube crystallizer.

NaCl salts are extracted in 2$^{nd}$ stage crystallization. Major impurities present in the NaCl brine include Sulfate (SO$_4$) ions, as all Sulfate (SO$_4$) does not precipitate with Na$_2$SO$_4$ salts in the 1$^{st}$ stage crystallizer, which inevitably deteriorates NaCl salt purity in the 2$^{nd}$ stage crystallizer. Sulfate (SO$_4$) impurities are precipitated in the a process as described herein by using chemical reaction in the reaction tank after the 1$^{st}$ stage crystallizer. These may be precipitated by addition of reactive chemicals, which are chemicals that, when added to solution, cause a chemical precipitation reaction to occur. Precipitated SO$_4$ ions are separated in the dewatering system before feeding into the 2$^{nd}$ stage crystallizer to improve purity of NaCl salts. These salts are further washed and dried to improve quality.

In the first stage crystallizer, the sodium sulfate salt is the first salt that will precipitate and form crystals upon concentration. As the sodium sulfate salts continue to precipitate and grow large crystals, the other ions (such as sodium and chloride) will continue to increase in concentration as dissolved ion present in the mother liquor. The dissolved chloride ion concentration is allowed to increase until a concentration of approximately 100,000-150,000 ppm is reached. At this point, a continuous blowdown stream is removed from the 1$^{st}$ Stage Crystallizer. This continuous blowdown stream prevents chloride ion concentration from reaching a point where sodium chloride salts would begin to precipitate. The salts that precipitate in the 1$^{st}$ Stage Crystallizer are sodium sulfate. This salt is dewatered in a centrifuge (or other dewatering device) and the mother liquor that remains in the salt (as residual moisture) is displaced by washing the sodium sulfate salt with pure distillate water. The resulting crystal discharging from the centrifuge (or other dewatering device) is then pure and suitable for beneficial reuse.

The blowdown from the 1$^{st}$ Stage Crystallizer is primarily composed of sodium and chloride ions. However, the stream also contains minor concentrations of impurities, such as calcium, magnesium, potassium and nitrate, among others. After the primary crystallization step of sodium sulfate, a residual concentration of sulfate is significantly still present in the blowdown (mother liquor), as the equilibrium concentration of sulfate in the crystallizer will be in the range of approximately 25,000-40,000 ppm. This impurity is removed in the chemical reaction tank of our process. The chemical reaction that occurs is an inventive process step that allows for the high purity of sodium chloride to be achieved in the subsequent 2$^{nd}$ Stage Crystallizer.

The chemical reaction can be facilitated by using one or more of the following chemical reactants, including calcium chloride and calcium hydroxide (lime), among others. The chemical reaction progresses in the form of the following reaction statements:

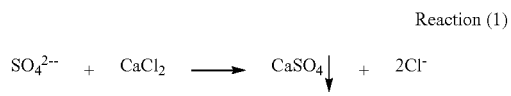

Reaction (1)

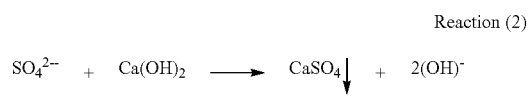

Reaction (2)

The chemical reactant functionally introduces calcium to the mother liquor stream, which affects the precipitation of sulfate in the form of calcium sulfate. The calcium sulfate precipitates and is removed from the stream with a dewatering device, such as a centrifuge or filter press among others. The resulting byproduct in the reaction is sodium chloride, which is the product to be recovered for beneficial reuse in the secondary crystallizer.

The stream leaving from a process as described herein is primarily sodium chloride brine and is substantially absent of impurities, containing only a small concentration of both calcium and sulfate. Typical concentrations of impurity that remain in the sodium chloride brine are in the range of approximately 0-1000 ppm of Calcium and 1,000-3,000 ppm of Sulfate. These concentrations are acceptable for pure NaCl production in the secondary crystallizer. As such, this sodium chloride effluent brine is sent to the 2$^{nd}$ Stage Crystallizer for sodium chloride production Salt purity standards in China are defined by GBT-5462-2003, and have a tiered method of defining salt purity. NaCl salt purity has minimum requirements in the range of 92.0% and 99.2%. Na$_2$SO$_4$ salt purity has minimum requirements of 92.0% and 99.3%. The salt purities achievable with the invented process satisfy the top-grade purity for both salt products, sodium chloride and sodium sulfate.

| 1. GBT_5462-2003-National Industry Salts(NaCl) | | | | | | |
|---|---|---|---|---|---|---|
| | Industry Solar Salts(NaCl) | | | Refined Industry Salts(NaCl) | | |
| Index | Top grade | First class | 2nd class | Top grade | First class | 2nd class |
| NaCl(%) ≥ | 96.00 | 94.50 | 92.00 | 99.10 | 98.50 | 97.50 |
| Water(%) ≤ | 3.00 | 4.10 | 6.00 | 0.30 | 0.50 | 0.80 |
| insoluble solids(%) ≤ | 0.20 | 0.30 | 0.40 | 0.05 | 0.10 | 0.20 |
| Ca2+, Mg2+ (%) ≤ | 0.30 | 0.40 | 0.60 | 0.25 | 0.40 | 0.60 |
| SO42-(%) ≤ | 0.05 | 0.70 | 1.00 | 0.30 | 0.50 | 0.90 |

2. GBT_5462-2003-National Industry Salts(Na$_2$SO$_4$)

| | Index | | | | | |
|---|---|---|---|---|---|---|
| | I | | II | | III | |
| | Top-grade | 1$^{st}$ class | 1$^{st}$ class | Confirming product | 1$^{st}$ class | Confirming product |
| Na$_2$SO$_4$(%) ≥ | 99.3 | 99 | 98.00 | 97.0 | 95 | 92 |
| Insoluble solids (%)≤ | 0.05 | 0.05 | 0.1 | 0.20 | — | — |
| Ca$^{2+}$, Mg$^{2+}$(%) ≤ | 0.1 | 0.15 | 0.30 | 0.40 | 0.6 | — |
| Cl-(%)≤ | 0.12 | 0.35 | 0.70 | 0.90 | 2.0 | |
| Fe(%) ≤ | 0.002 | 0.20 | 0.50 | 1.0 | — | — |
| Water(%) ≤ | 0.10 | 0.20 | 0.50 | 1.0 | 1.5 | |
| whiteness (R457) ≤ | 85 | 82 | 82 | — | — | |

In some embodiments of this invention, especially for wastewater flow rates that are especially large, partial concentration of the wastewater stream can be achieved upstream of the pure salt crystallization system. This pre-concentration step can be done to the wastewater streams immediately after blending, increasing the TDS from about 2,000 ppm to about 5,000 ppm and reducing the waste water flow rate by approximately 60% and recovering this water for recycle/reuse. Of the initial wastewater influent stream, 40% of the water remains and is sent to our two-stage crystallization process for pure salt recovery and ZLD achievement.

In another example, the wastewater streams are collected and are first softened in a clarifier (to reach approximately 100 mg/L as CaCO$_3$), then TSS is removed in a filtration step and then hardness is further reduced in an ion exchange system (to reach approximately <0.5 mg/L as CaCO$_3$). The ion exchange units are chemically regenerated which produces a hardness-rich regeneration waste stream. This stream is recycled upstream to the clarifier for removal of the hardness in the clarifier with the sludge. After these pretreatment steps, the softened wastewater stream may be concentrated to some extent by a reverse osmosis system. Since the wastewater now has a significantly reduced hardness concentration, the achievable recovery in the reverse osmosis system can be on the order of 80%. In such a design, assuming an influent TDS of 2,000 ppm the reverse osmosis system would increase the TDS of the reject stream to 10,000 ppm. Of the original influent wastewater stream, 80% of the water is recovered as pure permeate for reuse and 20% of the stream is rejected as concentrated RO Reject for further treatment. This reject stream contains the remaining contaminants and is then sent to our two-stage crystallization process for pure salt recovery and ZLD achievement.

One of the costs associated with our two-stage crystallization process is the calcium-based reactant chemical added in the our chemical reaction tank to affect the chemical precipitation. It is recognized that the regeneration waste stream is rich in calcium and may be suitable for reuse as a reactant in our two-stage crystallization process. Recycling of the calcium-rich regeneration waste waters from the upstream ion exchange process has the effect of reducing or eliminating the amount of chemical reactant required to be sourced externally.

Another example of a pre-concentration step is the use of a falling film evaporator. A falling film evaporator is comprised of a tube bundle which puts the brine water in thermal contact with water vapor (steam) such that heat is transferred across the tube surface to the falling brine film. This heat transfer results in some fraction of the falling brine film being evaporated as water vapor and the remaining brine is concentrated and leaves the evaporator at a higher concentration and lower volumetric flow. For example, the initial influent wastewater from the CTX process is fully softened with a softening clarifier, the TSS is filtered and the filter effluent passes through an ion exchange system to achieve <0.5 mg/L hardness concentration. The regeneration waste stream, rich in calcium, is recycled back to the clarifier for precipitation and removal with the sludge.

Assuming an influent TDS of 2,000 ppm then the falling film evaporator may achieve a final concentration of 160,000 ppm (for example) which reduces the influent water stream by 98.75%. The remaining 1.25% of the water still contains the salts and contaminants and is sent to our two-stage crystallization process for pure salt recovery and ZLD achievement.

In another manifestation of this technology, the inventors envision that a Seeded Brine Concentrator technology can be applied for preconcentration of the wastewater stream. A seeded brine concentrator is a vertical-tube falling film evaporator which maintains a calcium sulfate seed bed in the brine such that the calcium present in the feed water will precipitate as calcium sulfate salts onto the seed bed. In such a configuration of the invented art, the initial influent wastewater, for example wastewater from the CTX process, is fully softened with a softening clarifier, the TSS is filtered and the filter effluent passes through an ion exchange system to achieve <0.5 mg/L hardness concentration. The softened water is then sent to a reverse osmosis system operating at, for example, 80% recovery. In such a design, assuming an influent TDS of 2,000 ppm the reverse osmosis system would increase the TDS of the reject stream to 10,000 ppm. Of the original influent wastewater stream, 80% of the water is recovered as pure permeate for reuse and 20% of the stream is rejected as concentrated RO Reject for further treatment.

The RO reject stream can then be blended with the regeneration waste stream, rich in calcium. This blended stream now contains calcium and is sent to the seeded brine concentrator for treatment. Assuming the seeded brine concentrator feed water has a TDS of 10,000 ppm then the seeded brine concentrator may achieve a final concentration of 160,000 ppm (for example) which reduces the influent water stream by 94.75%. The remaining 5.25% of the water still contains the salts and contaminants as well as the calcium sulfate seeds existing as suspended solids. The calcium sulfate TSS is removed with a dewatering device (such as a centrifuge or filter press) and the TSS-free water is sent to our two-stage crystallization process for pure salt recovery and ZLD achievement.

Preconcentration technologies are not limited to these two types explained here. Other technologies such as forward osmosis, electrodialysis, membrane distillation, among others, and including combinations of these technologies, may also be used to reduce the volumetric flow rate of the water stream and simultaneously increase the salt concentration before it is sent to our two-stage crystallization process for pure salt recovery and ZLD achievement.

It is recognized the influent wastewater stream, from the CTX process or elsewhere, may contain significant concentrations of dissolved ions that are not removed in the softening system and the process as described herein that could diminish the purity of the sodium chloride salt generated in the second stage crystallizer. Dissolved ions such as potassium and nitrate are highly soluble and will increase to high concentrations in the second stage crystallizer. In the dewatering of sodium chloride, the mother liquor (which bears concentrations of potassium and nitrate), would remain as liquid interspersed within the sodium chloride crystals and cannot be efficiently removed with a washing step. In such cases, a small purge stream of mother liquor is continuously removed from the second stage sodium chloride crystallizer to control the concentrations of potassium and nitrate to acceptable levels. The small purge stream would be removed from the second stage crystallizer and treated with a drying technology, for example, such as a spray dryer, or could go to an evaporation pond. In this way, the facility achieves zero liquid discharge and simultaneously generates sodium sulfate and sodium chloride salts for beneficial reuse.

Another embodiment includes a nanofiltration step as pretreatment prior to our two-stage crystallization system. In such a design, the nano-filtration membrane is used to reject sulfate and other multivalent salts to generate a relatively pure NaCl stream as a membrane permeate. This NaCl membrane permeate stream may be processed with direct crystallization to produce a pure NaCl salt product. Application of nanofiltration effectively reduces the flow rate of the mixed-salt stream by the recovery percentage of the nanofiltration system. The reject stream from the nanofiltration system contains sulfate and chloride ions which can be sent to our two-stage crystallization system for generation of a pure sodium sulfate salt product and a sodium chloride salt product.

Those of skill in the art will recognize that while the examples and figures may emphasize water treatment in a CTX process, the methods reported herein may be generally useful to permit purification or re-use of waste water streams from other sources.

EXAMPLES

Example 1

In this example, we describe a typical embodiment of the invention, which can be employed to generate pure salts of sodium sulfate and sodium chloride. In a first part of this example, consider that various wastewater streams flow from the CTX process and are combined and blended. This blended wastewater stream is pretreated with various unit operations including softening with chemical agents including hydrated lime and sodium carbonate and sodium hydroxide. The softened water is then concentrated with membrane and thermal concentrators before being fed to our Crystallizer system for pure salt recovery. The volumetric flow rate of this stream is 50 ton/h feeding to the concentrator which is reduced to 13.6 ton/h as feed to our Crystallizer system. The TDS of this stream is 19.38% by weight.

In a first part of this example, consider a softened and concentrated stream with the following chemistry, which has relatively high concentrations of sulfate relative to chloride.

|   | Parameter | Unit | Concentrator Feed | 1st Stage Crystallizer Feed | Na2SO4 Crystallizer Blowdown | ACP Effluent |
|---|-----------|------|-------------------|-----------------------------|------------------------------|--------------|
| 1 | Mass Flow Rate | T/Hr | 51.5 | 13.6 | 4.46 | 4.46 |
| 2 | Ca | ppm | 0 | 0 | 0 | 588 |
| 3 | Mg | ppm | 0 | 0 | 0 | 0 |
| 4 | Na | ppm | 18293 | 69433 | 107680 | 95554 |
| 5 | K | ppm | 49 | 184 | 559 | 551 |
| 6 | CO3 | ppm | 0 | 0 | 0 | 0 |
| 7 | HCO3 | ppm | 5 | 18 | 54 | 0 |
| 8 | Cl | ppm | 12621 | 47905 | 146091 | 147861 |
| 9 | SO4 | ppm | 20388 | 77385 | 27707 | 1412 |
| 10 | NO3 | ppm | 19 | 74 | 224 | 220 |
| 11 | TDS | ppm | 51376 | 195000 | 282316 | 246186 |

The influent stream is fed to a first stage crystallizer. The crystallizer concentrates the ions that are present such that sodium sulfate crystals begin to form and precipitate form the wastewater solution. As this occurs, the chloride concentration dissolved in the water is allowed to increase up to a point which is lower than the saturation point of sodium chloride. For this example, the concentration of chloride in the first stage crystallizer is controlled to less than 147,000 ppm and a blowdown stream of brine is removed from the first stage crystallizer such that this chloride concentration is achieved.

The sodium sulfate salts that precipitate and grow in the first stage crystallizer are dewatered and have a final salt purity of more than 95%. The salt can be washed and dried to remove impurities to achieve higher salt purities greater than 99% as sodium sulfate. The amount of sodium sulfate generated is 1.44 ton/h.

The blowdown stream from the first stage crystallizer is sent to the reaction tank of this process where 143 kg/h of 100% Calcium Chloride are added. In this process, the soluble equilibrium concentration of sulfate is reduced dramatically by precipitating calcium sulfate from the solution. Approximately 358 kg/h of calcium sulfate are dewatered and removed from our system and the effluent water is rich in sodium chloride and prepared for the second stage crystallizer.

The second stage crystallizer concentrates the dissolved salt and precipitates and grows sodium chloride crystals. The sodium chloride salts that precipitate and grow in the first stage crystallizer are dewatered and have a final salt purity of more than 99%. The salt can be washed and dried to remove impurities to achieve higher salt purities greater than 99% as sodium chloride. The amount of sodium chloride generated is 1.07 ton/h.

Example 2

In this example, consider this alternate water chemistry which is to be fed to the invented art. This chemistry differs from that of Example 1 in that it has a relatively higher concentration of sodium chloride, relative to sodium sulfate, and we show how the invented art is flexible to generate pure salts with changes in feed water chemistry. Sodium sulfate salt produced is 814 kg/h. Sodium chloride salt produced is 1.64 ton/h.

| | Parameter | Unit | Concentrator Feed | 1st Stage Crystallizer Feed | Na2SO4 Crystallizer Blowdown | ACP Effluent |
|---|---|---|---|---|---|---|
| 1 | Mass Flow Rate | T/Hr | 51.5 | 13.6 | 6.7 | 6.7 |
| 2 | Ca | ppm | 0 | 0 | 0 | 588 |
| 3 | Mg | ppm | 0 | 0 | 0 | 0 |
| 4 | Na | ppm | 18293 | 69433 | 107679 | 95524 |
| 5 | K | ppm | 49 | 184 | 373 | 367 |
| 6 | CO3 | ppm | 0 | 0 | 0 | 0 |
| 7 | HCO3 | ppm | 5 | 18 | 36 | 0 |
| 8 | Cl | ppm | 18932 | 71858 | 145958 | 147689 |
| 9 | SO4 | ppm | 14078 | 53433 | 27714 | 1412 |
| 10 | NO3 | ppm | 19 | 74 | 149 | 147 |
| 11 | TDS | ppm | 51376 | 195000 | 281909 | 245728 |

Example 3

In this example, the conventional mixed-salt crystallizer technology is compared with a process as first described herein for Pure Salt Crystallization.

Consider a process similar to that described in Example 1, which generates 13.6 ton/h hour of concentrated brine flowing from the upstream concentration stage. As shown in the Example 1, our pure salt crystallization process was applied to generate 1.44 ton/h of pure sodium sulfate and 1.07 ton/h of pure sodium chloride salts.

In this example, we consider a mixed-salt crystallizer which would be fed the softened and concentrated stream directly and directly crystallizes all of the dissolved salts in the same crystallizer, generating a salt crystal mixture of sodium sulfate and sodium chloride—a mixed salt. This salt can be similarly dewatered and generates a mixed salt flow rate of 2.65 ton/h.

Here we see the limitation of the conventional technology as it generates a waste salt stream of 2.65 ton/h, which must be disposed of in a landfill. In comparison, our Pure Salt Crystallizer generated product salt streams of 1.44 ton/h sodium sulfate and 1.07 ton/h sodium chloride which can be sold in the market for beneficial reuse.

For illustration of the economic impact that this could have on an operating CTX facility, we consider the annual operating costs/revenues possible with such a contrasting system. The conventional technology has a disposal cost associated with mixed-salt landfill disposal of $300 USD/ton which results in an annual operating expense of $6,964,000 USD. In contrast, the pure salt production process has a much smaller solids disposal rate of 0.36 ton/h which results in an operating expense of $946,000 USD. This disposal cost is much lower than the conventional technology and the facility also has the potential to sell the pure salt products into the market place. Considering a salt value (for sodium sulfate and sodium chloride) of $50/ton, the facility has potential to generate revenue of $1,099,000 USD for the sale of 2.51 ton/h of pure salt product.

| Unit Rates | USD/ton |
|---|---|
| Mixed Salt Landfill Disposal Cost | $300.00 |
| NaCl Pure Salt Benefit | $50.00 |
| Na2SO4 Pure Salt Benefit | $50.00 |

| Cost/Benefit Summary | Mixed Salt Crystallizer | ACP Pure Salt Crystallizer |
|---|---|---|
| Mixed Salt Quantity (ton/year) | 23214 | 0 |
| Pure Na2SO4 Quantity (ton/year) | 0 | 12614 |
| Pure NaCl Quantity (ton/year) | 0 | 9373 |
| Total Cost/Benefit | $(6,964,200) | $1,099,380 |

Example 4

This example illustrates the use and limitations of a nanofiltration membrane system for creating a stream capable of generating sodium chloride pure salt.

In this example, consider a waste water stream with a flow rate of 70.4 ton/hr and consisting of dissolved concentrations of ions including sulfate and chloride. The wastewater stream has already been treated to remove hardness and has been preconcentrated. The stream is fed to a nanofiltration membrane which splits the stream at a 60% recovery as permeate and 40% reject as mixed salt brine. The permeate stream contains primarily sodium and chloride ions and has largely rejected sulfate. This permeate stream can be taken directly to a NaCl crystallizer for recovery of the NaCl product salt. The pure sodium chloride produced is 1.40 ton/h in the NaCl crystallizer. Note that the feedwater to the sodium chloride crystallizer still contains impurities in the form of monovalent ions which are not sodium and chloride which will lead to impurity in the generated sodium chloride salt. As such, a small purge stream is continuously removed from the sodium chloride crystallizer and sent to the mixed-salt crystallizer (described in the subsequent paragraph) to maintain sodium chloride salt purity and to achieve zero-liquid discharge.

The reject stream from the nanofiltration system is blended with the purge stream from the sodium chloride crystallizer and is sent to a mixed salt crystallizer to achieve zero-liquid discharge. The 32.6 ton/hr stream is concentrated in the crystallizer to recover the water for recycle back to the CTX plant. The crystallizer produces a mixed salt quantity of 3.6 ton/hr which is sent away for landfill disposal.

This example shows that the nanofiltration membrane system in itself is incapable of creating a stream capable of generating sodium sulfate pure salt.

| | Parameter | Unit | Concentrated Wastewater | NF Permeate to NaCl Crystallizer | NF Reject to Mixed Salt Crystallizer |
|---|---|---|---|---|---|
| 1 | Flow | T/Hr | 70.4 | 37.80 | 32.6 |
| 2 | Ca | ppm | 0 | 0 | 0 |
| 3 | Mg | ppm | 0 | 0 | 0 |
| 4 | Na | ppm | 24579 | 15563 | 38455 |
| 5 | K | ppm | 1686 | 460 | 3055 |
| 6 | CO3 | ppm | 131 | 44 | 277 |
| 7 | HCO3 | ppm | 114 | 19 | 67 |
| 8 | Cl | ppm | 23112 | 23335 | 22470 |
| 9 | SO4 | ppm | 21176 | 1080 | 44453 |
| 10 | NO3 | ppm | 1731 | 1747 | 1683 |
| 11 | TDS | ppm | 72529 | 42248 | 110459 |

We claim:

1. A method for salt production from a wastewater stream, comprising:
   a) providing a wastewater stream comprising sulfate ions and chloride ions;
   b) pretreating the wastewater stream with at least one unit operation selected from the group consisting of hardness removal, silica reduction, alkalinity reduction, total organic carbon reduction, and pH adjustment;
   c) feeding the wastewater stream to a first stage crystallizer, thereby precipitating and growing sodium sulfate crystals in a first mother liquor;
   d) separating the sodium sulfate crystals from the first mother liquor;
   e) collecting the first mother liquor and sending it to a chemical reaction vessel;
   f) dosing a reactive chemical to the chemical reaction vessel to remove sulfate ion from solution in the wastewater stream as a precipitated solid and removing the precipitated solid to produce a purified sodium chloride brine, wherein the reactive chemical is selected from the group consisting of $Ca(NO_3)_2$ and $Ca(OH)_2$;
   g) sending the purified sodium chloride brine into a second stage crystallizer, thereby precipitating and growing sodium chloride crystals in a second mother liquor; and
   h) separating the sodium chloride crystals from the second mother liquor.

2. A method for salt production from a wastewater stream, comprising:
   a) providing a wastewater stream comprising sulfate ions and chloride ions;
   b) pretreating the wastewater stream with at least one unit operation selected from the group consisting of hardness removal, silica reduction, alkalinity reduction, total organic carbon reduction, and pH adjustment;
   c) feeding the wastewater stream to a first stage crystallizer, thereby precipitating and growing sodium sulfate crystals in a first mother liquor;
   d) separating the sodium sulfate crystals from the first mother liquor;
   e) collecting the first mother liquor and sending it to a chemical reaction vessel;
   f) dosing a reactive chemical to the chemical reaction vessel to remove sulfate ion from solution in the wastewater stream as a precipitated solid and removing the precipitated solid to produce a purified sodium chloride brine;
   g) sending the purified sodium chloride brine into a second stage crystallizer, thereby precipitating and growing sodium chloride crystals in a second mother liquor;
   h) separating the sodium chloride crystals from the second mother liquor; and
   i) removing a purge stream from the second stage crystallizer to enhance salt purity.

3. The method of claim 2, wherein the wastewater stream is a coal to gas wastewater stream.

4. The method of claim 1, further comprising concentrating the wastewater stream prior to at least one of the pretreatment step and the step of sending the wastewater stream to the chemical reaction vessel.

5. The method of claim 4, wherein the concentration step includes at least one process selected from the group consisting of membrane concentration and thermal evaporation.

6. The method of claim 1, wherein said separating steps are conducted by dewatering in a centrifuge.

7. The method of claim 2, wherein said reactive chemical is selected from the group consisting of $CaCl_2$, $Ca(NO_3)_2$, and $Ca(OH)_2$.

8. The method of claim 3, further comprising recycling water from the second mother liquor into a coal gasification process.

9. The method of claim 2, further comprising washing and/or drying the sodium sulfate salt, thereby enhancing its purity.

10. The method of claim 2, further comprising washing and/or drying the sodium chloride salt, thereby enhancing its purity.

11. The method of claim 2, further comprising processing the purge stream in a processor selected from the group consisting of a mixed-salt crystallizer and a dryer.

12. The method of claim 8, wherein the coal gasification process and method for salt production operate as a zero liquid discharge system with respect to water.

13. The method of claim 1, wherein the pretreatment step is a hardness removal step, and wherein the hardness removal step produces a regeneration waste stream from an ion exchanger.

14. The method of claim 13, wherein the regeneration waste stream comprises $CaCl_2$, and wherein said $CaCl_2$ is recycled as a reactive chemical.

15. The method of claim 1, comprising evaporating water in the first stage crystallizer with at least one of mechanical vapor compression, steam driven, multiple effect evaporation, and thermo-compressor driven evaporation.

16. The method of claim 5, wherein the concentrating of the wastewater stream includes nanofiltration that rejects more than 90% of the sulfate ion from the wastewater stream.

17. A method for salt production from a wastewater stream, comprising:
   a) providing a wastewater stream comprising sulfate ions and chloride ions;
   b) pretreating the wastewater stream;
   c) sending the wastewater stream to a chemical reaction vessel;
   d) dosing a reactive chemical to the chemical reaction vessel to remove sulfate ion from solution in the wastewater stream as a precipitated solid and removing the precipitated solid to produce a purified sodium chloride brine;
   e) sending the purified sodium chloride brine into a crystallizer, thereby precipitating and growing sodium chloride crystals in a mother liquor;
   f) separating the sodium chloride crystals from the mother liquor; and
   g) removing a purge stream from the crystallizer to enhance salt purity.

18. The method of claim 17, further comprising concentrating the wastewater stream prior to at least one of the pretreatment step and the step of sending the wastewater stream to the chemical reaction vessel, wherein the concentrating of the wastewater stream includes at least one process selected from the group consisting of membrane concentration and thermal evaporation.

19. The method of claim 18, wherein the step of pretreating the wastewater stream includes using a nanofiltration that rejects more than 90% of the sulfate ion from the wastewater stream.

20. The method of claim 17, comprising evaporating water in the crystallizer with at least one of mechanical vapor compression, steam driven, multiple effect evaporation, and thermo-compressor driven evaporation.

\* \* \* \* \*